(12) United States Patent
Devarajan et al.

(10) Patent No.: US 12,166,905 B2
(45) Date of Patent: *Dec. 10, 2024

(54) ENCRYPTED TRAFFIC INSPECTION IN A CLOUD-BASED SECURITY SYSTEM

(71) Applicant: Zscaler, Inc., San Jose, CA (US)

(72) Inventors: Srikanth Devarajan, Cupertino, CA (US); Vijay Bulusu, Fremont, CA (US); Leslie McCutcheon, Fremont, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,241

(22) Filed: Aug. 1, 2023

(65) Prior Publication Data

US 2024/0007305 A1 Jan. 4, 2024

Related U.S. Application Data

(63) Continuation of application No. 17/715,137, filed on Apr. 7, 2022, now Pat. No. 11,750,405, which is a continuation of application No. 16/863,475, filed on Apr. 30, 2020, now Pat. No. 11,394,563.

(51) Int. Cl.
*H04L 9/32* (2006.01)
*H04L 9/40* (2022.01)

(52) U.S. Cl.
CPC ........ *H04L 9/3263* (2013.01); *H04L 63/0428* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 9,602,291 B2 | 3/2017 | Ashley et al. | |
| 2003/0028606 A1 | 2/2003 | Koopmans et al. | |
| 2003/0053448 A1 | 3/2003 | Craig et al. | |
| 2004/0210674 A1 | 10/2004 | Gbadegesin | |
| 2005/0144328 A1 | 6/2005 | McBeath | |
| 2006/0031407 A1 | 2/2006 | Dispensa et al. | |
| 2010/0024026 A1 | 1/2010 | Yionen | |
| 2010/0318665 A1 | 12/2010 | Demmer et al. | |
| 2014/0325087 A1 | 10/2014 | Barreto et al. | |
| 2015/0143504 A1 | 5/2015 | Desai et al. | |
| 2016/0080502 A1* | 3/2016 | Yadav | H04L 43/04 709/227 |
| 2016/0149898 A1 | 5/2016 | Parla et al. | |

(Continued)

*Primary Examiner* — Brandon Hoffman
(74) *Attorney, Agent, or Firm* — Baratta Law PLLC; Lawrence A. Baratta, Jr.

(57) ABSTRACT

A node configured as any of a proxy, a Secure Web Gateway, and a Secure Internet Gateway is configured to perform steps of, responsive to establishing a connection with a user device having a user associated with a tenant and obtaining policy for the user, monitoring traffic between the user device and the Internet where the monitoring is at a middle location, inline between the user device and an endpoint; responsive to the traffic being encrypted as a tunnel, performing one or more operations to enable accessing the encrypted traffic; analyzing the traffic based on the policy, including at least checking for malicious traffic and Data Loss Prevention (DLP) for the tenant; and one of allowing, blocking, or limiting the traffic based on the analyzing.

20 Claims, 10 Drawing Sheets

(56) References Cited

U.S. PATENT DOCUMENTS

| | | |
|---|---|---|
| 2016/0234104 A1 | 8/2016 | Hoffmann |
| 2016/0248812 A1* | 8/2016 | Desai et al. |
| 2017/0012870 A1* | 1/2017 | Blair .................. H04L 12/4633 |
| 2017/0064749 A1 | 3/2017 | Jain et al. |
| 2017/0078328 A1 | 3/2017 | McGinnity et al. |
| 2017/0142068 A1 | 5/2017 | Devarajan et al. |
| 2017/0325113 A1 | 11/2017 | Markopoulou et al. |
| 2017/0346853 A1 | 11/2017 | Wyatt et al. |
| 2018/0063077 A1 | 3/2018 | Tumuluru |
| 2018/0181431 A1 | 6/2018 | Vincent et al. |
| 2018/0288062 A1 | 10/2018 | Goyal et al. |
| 2019/0238592 A1 | 8/2019 | Qureshi et al. |
| 2020/0092264 A1 | 3/2020 | Rahkonen et al. |
| 2020/0236093 A1 | 7/2020 | Bannister et al. |

* cited by examiner

ENCRYPTED TRAFFIC INSPECTION IN A CLOUD-BASED SECURITY SYSTEM

CROSS-REFERENCE TO RELATED APPLICATION(S)

The present disclosure is a continuation of U.S. patent application Ser. No. 17/715,137, filed Apr. 7, 2022, which is now U.S. Pat. No. 11,750,405, issued Sep. 5, 2023, and which is a continuation of U.S. patent application Ser. No. 16/863,475, filed Apr. 30, 2020, which is now U.S. Pat. No. 11,394,563, issued Jul. 19, 2022, the contents of each are incorporated by reference in their entirety.

FIELD OF THE DISCLOSURE

The present disclosure relates generally to networking and computing. More particularly, the present disclosure relates to systems and methods for encrypted traffic inspection in a cloud-based security system, such as Secure Sockets Layer (SSL), Transport Layer Security (TLS), Datagram TLS (DTLS), Hypertext Transfer Protocol Secure (HTTPS), and the like.

BACKGROUND OF THE DISCLOSURE

There has been significant growth in encrypted traffic on the Internet. For example, protocols such as SSL, TLS, DTLS, HTTPS, etc. are used to provide privacy and data integrity. According to some forecasts, 70% or more of all Web traffic now uses SSL, and these numbers are growing. Encrypted traffic presents a security hole, i.e., a blind spot. Enterprises conventionally have deployed appliances and other devices at the network perimeter to perform security functions. In terms of encrypted traffic, the appliances need to break the encryption in order to monitor the traffic. This is resource intense, and conventional appliances simply do not scale. As such, most enterprises simply forego the inspection of encrypted traffic. Other studies have shown that the majority of malware today is hidden in encrypted traffic. Also, encrypted traffic presents a problem in terms of Data Loss Prevention (DLP) because sensitive data is typically concealed in SSL/TLS traffic, which is difficult and expensive to inspect (in terms of cost, processing capability, and latency). Without visibility and control, organizations are at an increased risk of data loss, due either to unintentional or malicious reasons. The conventional appliance and network perimeter security approach is breaking down with the mobility of users, the processing capability of user devices, etc. As such, security is moving to the cloud, namely as a service offered through a cloud-based system.

There is a need for techniques for inspecting encrypted traffic in a cloud-based security system.

BRIEF SUMMARY OF THE DISCLOSURE

The present disclosure relates to systems and methods for encrypted traffic inspection in a cloud-based security system, such as Secure Sockets Layer (SSL), Transport Layer Security (TLS), Hypertext Transfer Protocol Secure (HTTPS), and the like. The cloud-based security system is configured to monitor users in an inline manner as a proxy or Secure Web or Internet Gateway, including monitoring encrypted traffic, e.g., Secure Sockets Layer (SSL)/Transport Layer Security (TLS) traffic. Based on this proxy by the design aspect of the cloud-based security system, the cloud-based security system can provide inspection on encrypted traffic, such as SSL, TLS, DTLS, HTTPS, etc., without the inspection limitations of appliances. Various approaches are contemplated, including a snooping approach, a Man-in-the-Middle (MitM) proxy approach, and the like. The snooping approach includes snooping session keys and utilizing the snooped keys to non-intrusively monitor the encrypted traffic. Advantageously, this approach does not terminate the encrypted traffic. The MitM proxy approach has a cloud node that sits as a proxy between a user device and an endpoint where the proxy breaks the encrypted traffic in the middle. With the inspection of encrypted traffic, the cloud-based security system can perform a full suite of security functions on the traffic.

The systems and methods include monitoring traffic between a user device and the Internet; detecting and monitoring a handshake between the user device and an endpoint for determining keys associated with encryption between the user device and the endpoint; monitoring encrypted traffic between the user device and the endpoint subsequent to the handshake based on the keys; and performing one or more security functions on the encrypted traffic based on the monitoring. The node can be part of a cloud-based security system and configured inline between the user device and the endpoint.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like;

FIG. 4 is a block diagram of a user device that may be used with the cloud-based system of FIGS. 1 and 2 or the like;

DETAILED DESCRIPTION OF THE DISCLOSURE

Again, the present disclosure relates to systems and methods for encrypted traffic inspection in a cloud-based security system, such as Secure Sockets Layer (SSL), Transport Layer Security (TLS), Hypertext Transfer Protocol Secure (HTTPS), Datagram TLS (DTLS), and the like. The cloud-based security system is configured to monitor users in an inline manner as a proxy or Secure Web or Internet Gateway, including monitoring encrypted traffic, e.g., Secure Sockets Layer (SSL)/Transport Layer Security (TLS) traffic. Based on this proxy by the design aspect of the cloud-based security system, the cloud-based security system can provide inspection on encrypted traffic, such as SSL, TLS, DTLS, HTTPS, etc., without the inspection limitations of appliances. Various approaches are contemplated, including a snooping approach, a Man-in-the-Middle (MitM) proxy approach, and the like. The snooping approach includes snooping session keys and utilizing the snooped keys to non-intrusively monitor the encrypted traffic. Advantageously, this approach does not terminate the encrypted traffic. The MitM proxy approach has a cloud node that sits as a proxy between a user device and an endpoint where the proxy breaks the encrypted traffic in the middle. With the inspection of encrypted traffic, the cloud-based security system can perform a full suite of security functions on the traffic.

Example Cloud-Based System Architecture

Figure 1:
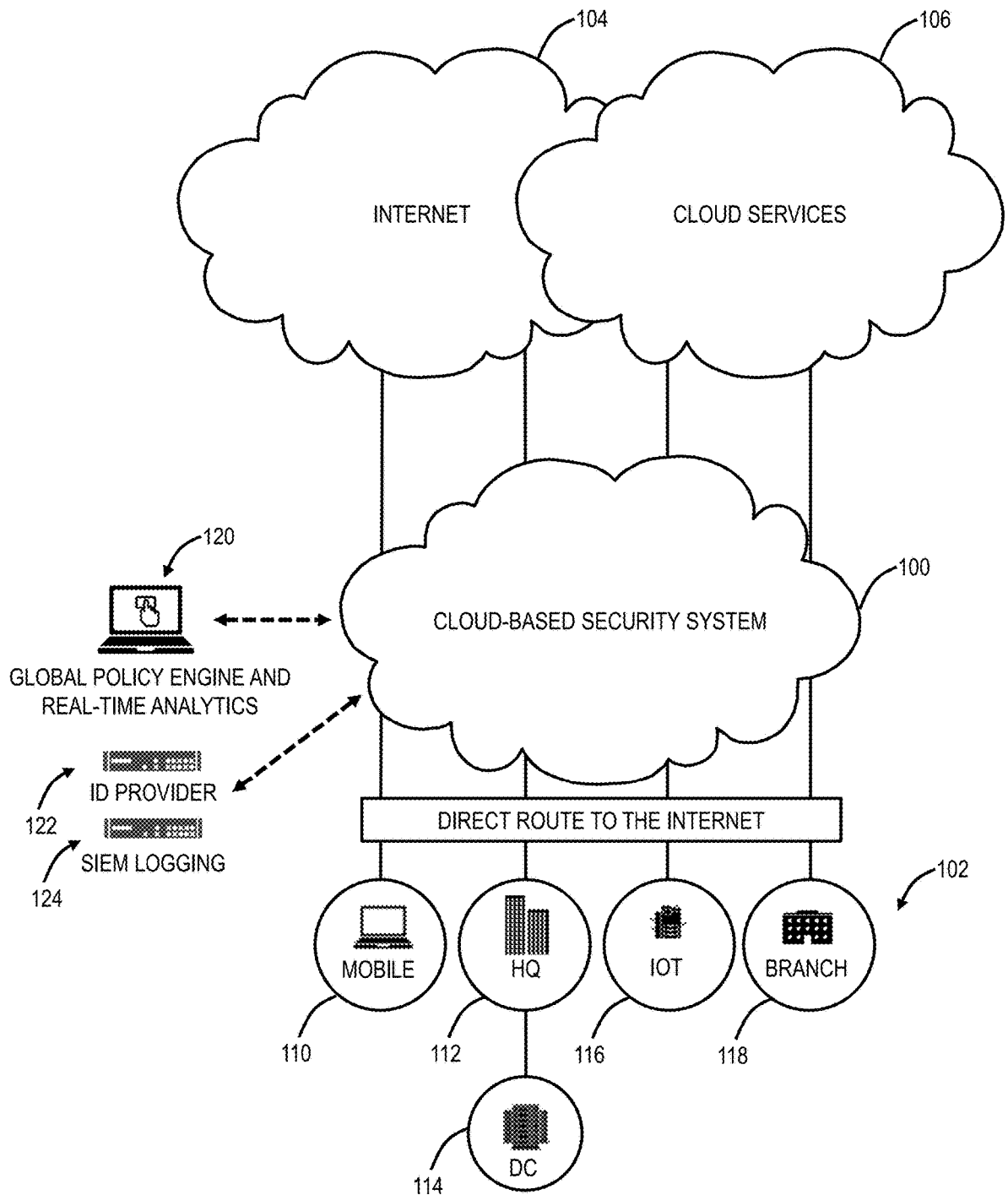
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including encrypted traffic such as SSL, TLS, DTLS, HTTPS, etc. traffic. Note, various functions described herein are attributed as being performed by the cloud-based system 100. Those skilled in the art will recognize such functions can also be viewed as being performed via a cloud service offered by the cloud-based system 100, as well as being implemented at one or more nodes in the cloud-based system 100.

The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. The DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 3:
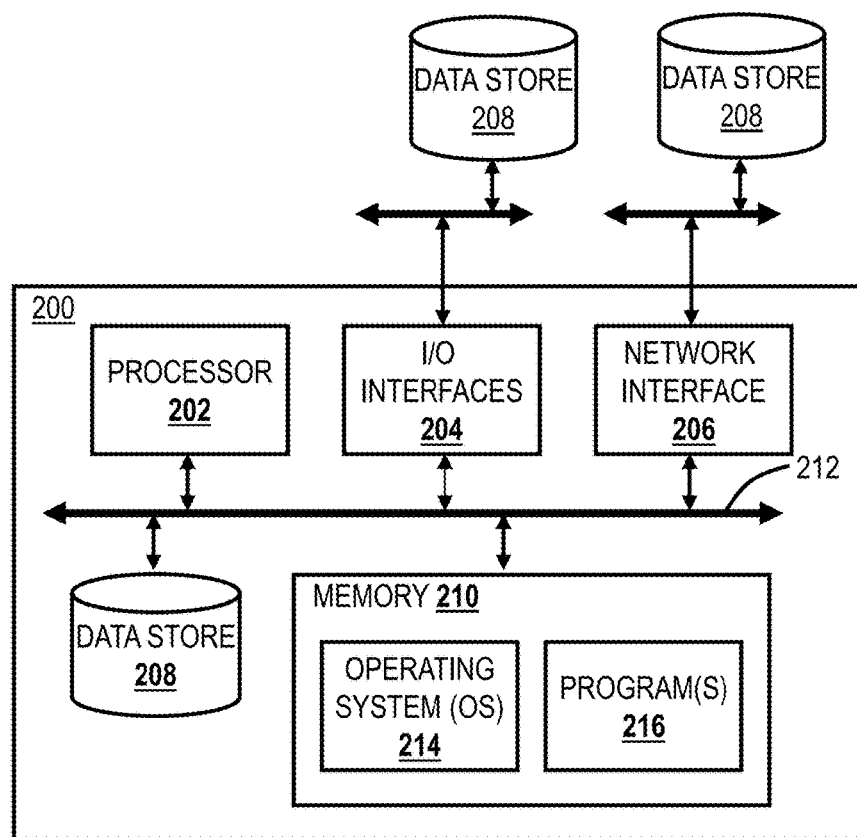

For illustration purposes, the users 102 of the cloud-based system 100 can include a mobile device 110, a headquarters (HQ) 112 which can include or connect to a data center (DC) 114, Internet of Things (IoT) devices 116, a branch office 118, etc., and each includes one or more user devices (an example user device 300 is illustrated in FIG. 3). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
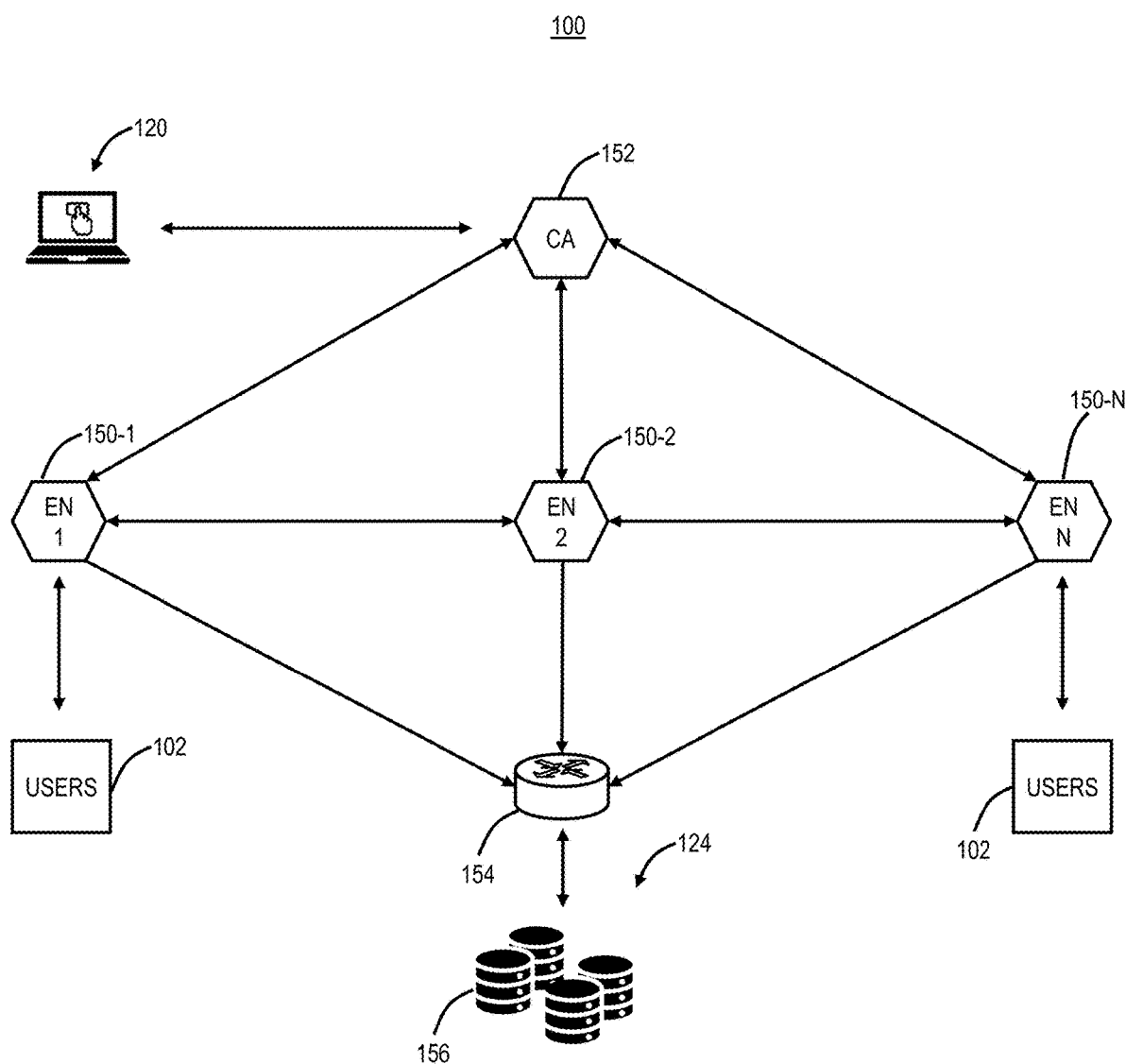
FIG. 2 is a network diagram of an example implementation of the cloud-based system.

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150, 152, while described as nodes, can include one or more servers, including physical servers, virtual machines (VM) executed on physical hardware, etc. An example of a server is illustrated in FIG. 2. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

The enforcement nodes 150 are full-featured secure internet gateways that provide integrated internet security. They inspect all web traffic bi-directionally for malware and enforce security, compliance, and firewall policies, as described herein. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured to never store any data to disk. Packet data is held in memory for inspection and then, based on policy, is either forwarded or dropped. Log data generated for every transaction is compressed, tokenized, and exported over secure TLS connections to the log routers 154 that direct the logs to the storage cluster 156, hosted in the appropriate geographical region, for each organization.

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 in order to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

Once downloaded, a tenant's policy is cached until a policy change is made in the management system 120. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources in lieu of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

Figure 4:
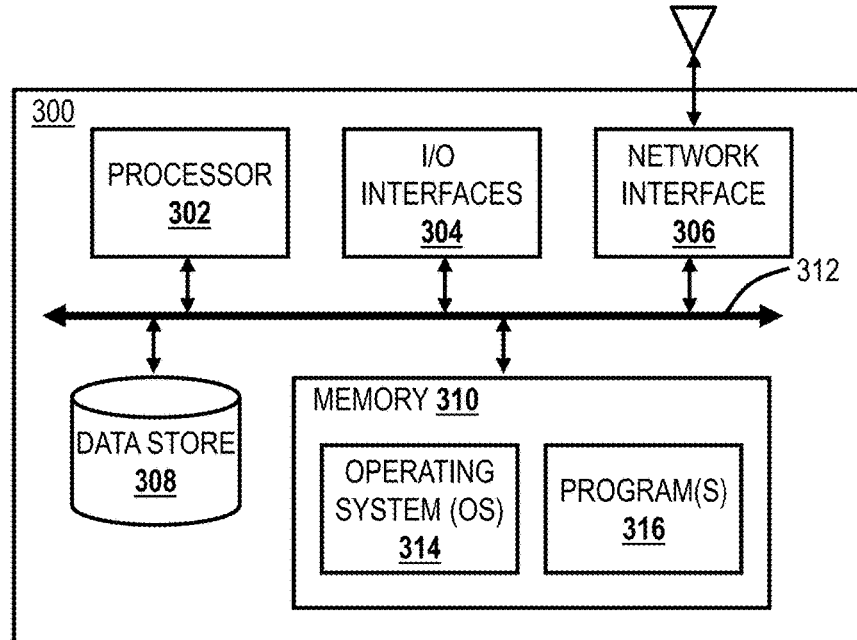

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

User Device Application for Traffic Forwarding and Monitoring

Figure 5:
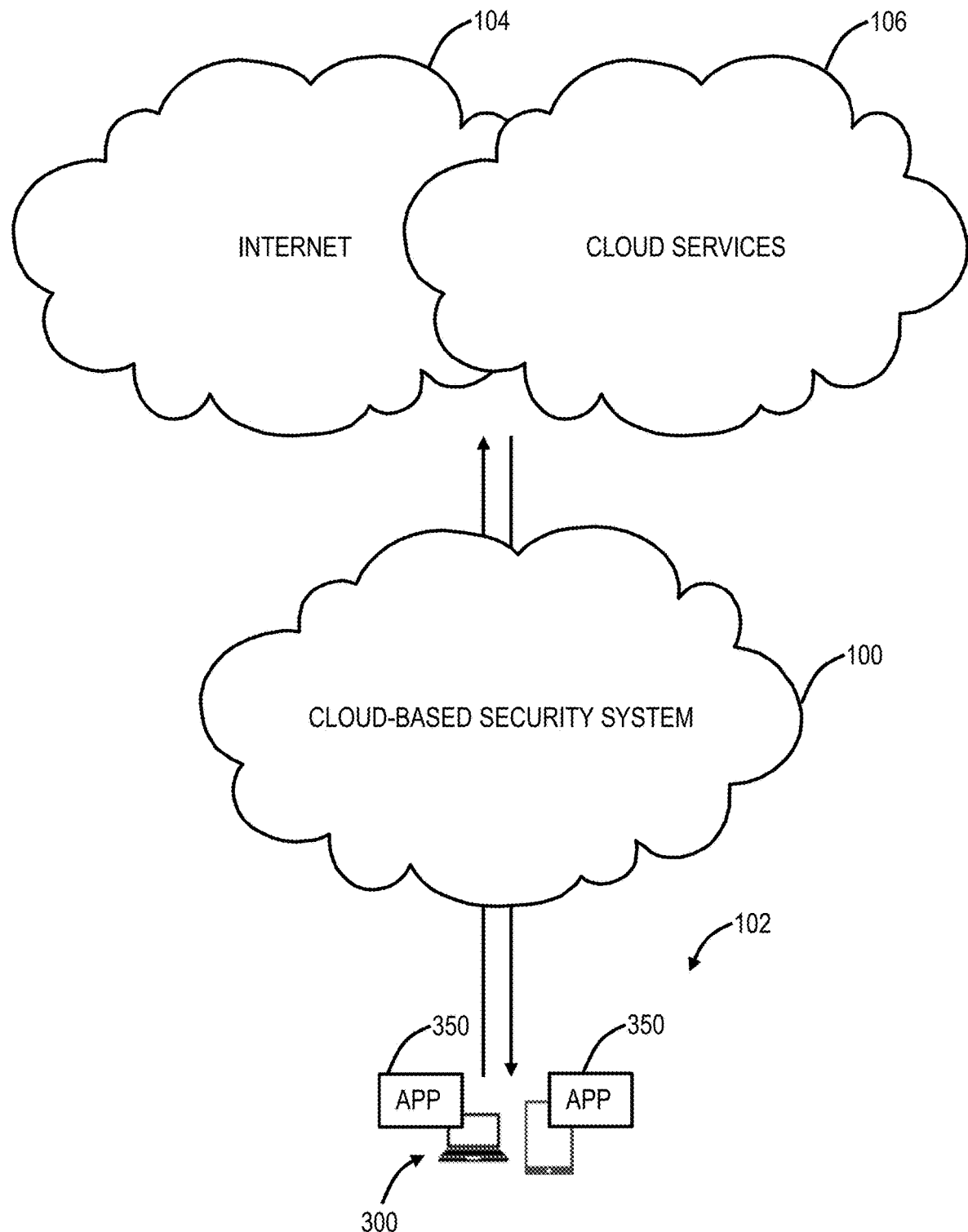
FIG. 5 is a network diagram of the cloud-based system illustrating an application on user devices with users configured to operate through the cloud-based system.

FIG. 5 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best in class security with zero trust access to internal apps.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to seamlessly deploy and manage the user devices 300. This can also include automatic installation of client and SSL certificates or another type of certificate during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPSec VPN, authentication cookies, or end user 102 setup.

SSL Overview

Figure 6:
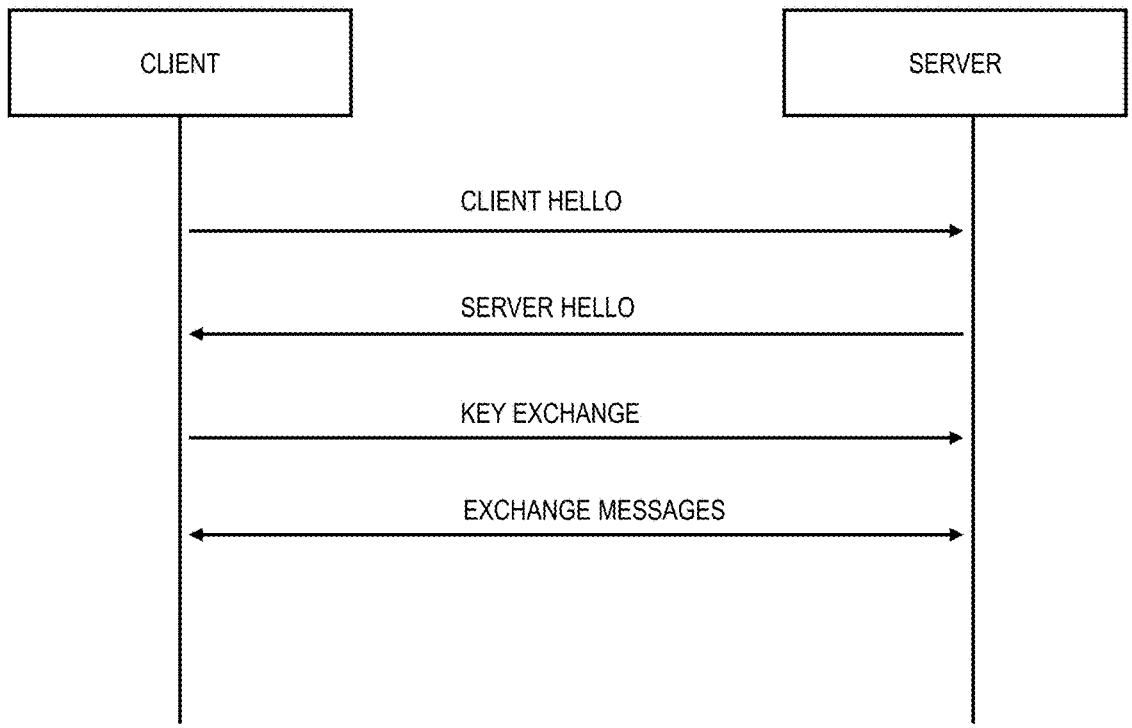
FIG. 6 is a flow diagram illustrating an example handshake for HTTPS to describe a secure, encrypted tunnel between a client (e.g., the user device of FIG. 4) and a server (e.g., the server of FIG. 3)

Secure Sockets Layer (SSL) is a client-server protocol that creates a secure channel over the Internet. SSL is used to validate the identity of the destination server and (optionally) the client, and to encrypt information sent across the internet between the client and server. FIG. 6 is a flow diagram illustrating an example handshake for HTTPS to describe a secure, encrypted tunnel between a client (e.g., the user device 300) and a server (e.g., the server 200). When a client, such as a browser, first sends an HTTPS request to a server, it starts a series of message exchanges called the SSL handshake. The client can send an HTTPS request with supported cipher suites and compression algorithms, session ID, SSL version, and a randomly generated value, i.e., a "client hello."

The server sends its digital certificate to the client to authenticate itself, as well as the selected cipher suite and compression algorithm, session ID, SSL session, a randomly generated value, a certificate with a public key, and optionally a request for the client's certificate, i.e., a "server hello." The client verifies the certificate with a Certificate Authority (CA), sends the pre-master secret computed with both random values, and encrypted with the server's public key. The client notifies the server that all subsequent messages will be encrypted with the keys and negotiated algorithms, i.e., the client and server agree on the SSL protocol version and algorithms to use, and the client and server generate the symmetric keys they will use to encrypt their messages.

The server uses its private key to decrypt the pre-master key, only the server with the private key that matches the public key that was sent with the certificate can decrypt the pre-master key. The server validates the browser (client) certificate and uses the public key to decrypt the messages. The server notifies the client that all subsequent messages will be encrypted using the keys and negotiated algorithms. The server computes the master key from the pre-master key and generates the session key. The server sends a message that is a hash of the exchanged messages using the master key and the session key. The client decrypts the message and validates the hash, leading to a successful handshake.

After the SSL handshake is successfully completed, the client and server continue with the standard HTTP communications in a secure manner.

Figure 7:
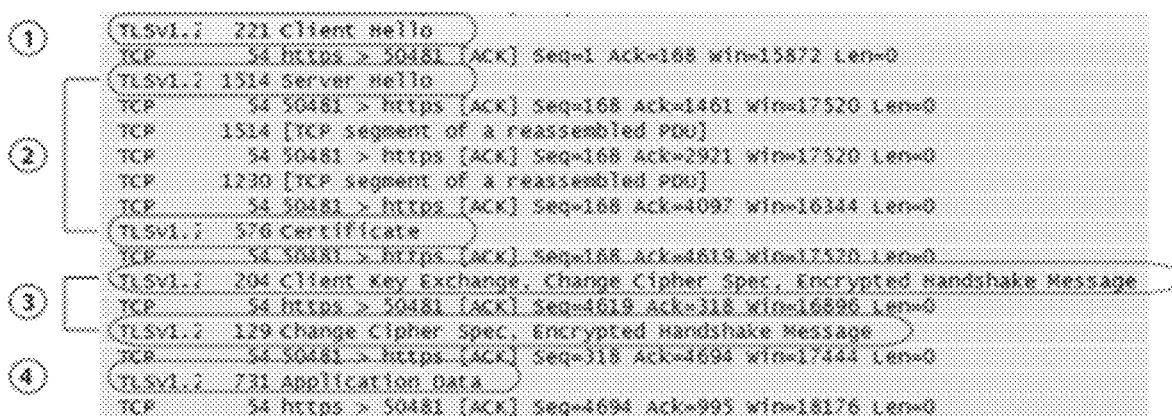
FIG. 7 is a screenshot of packet capture showing SSL packets as they are exchanged between a client and a server.

FIG. 7 is a screenshot of packet capture showing SSL packets as they are exchanged between a client and a server. The client sends its HTTPS request in the Client Hello. The entire HTTPS message is encrypted, including the headers and the request/response load. The actual hostname and domain name being accessed is not visible. How the cloud-based system 100 determines the destination hostname depends on whether it is operating in transparent mode or explicit mode. The server responds with its Hello message and its certificate. (A certificate is an electronic form that verifies the identity and public key of the subject of the certificate.) SSL uses the Public Key Infrastructure (PKI) to ensure the trustworthiness of the certificates. The client and server continue with the SSL negotiation. After the SSL tunnel is established, the application data is sent securely through the tunnel.

SSL uses Public Key Infrastructure (PKI) to ensure the trustworthiness of the certificates. PKI uses a trusted third party, called a Certificate Authority (CA), to guarantee the identity of an entity. When a CA verifies an entity's identity, it uses an algorithm, such as RSA, to generate a public and private key. It gives the private key to the requesting entity, and the public key is made available to the public. To authenticate itself to another party, the entity uses its private key to encrypt its certificate, and the other party uses the corresponding public key to decrypt it.

A CA issues certificates in a tree structure, with the root certificate as the top-most certificate. The CA signs the root certificate, which is considered trustworthy in many software applications, such as web browsers. Web browsers have the root certificates of many CAs.

A root certificate can sign and designate a certificate as an intermediate CA certificate, which can sign and designate other certificates as intermediate certificates as well. A certificate chain refers to the list of certificates that complete the chain of trust, from the trusted root CA certificate to any intermediate certificates and the certificate of an entity. The following is an example of a certificate chain.

The certificate of mail.google.com was signed by Google Internet Authority G2.
The certificate of Google Internet Authority G2 was signed by GeoTrust Global CA.
The certificate of GeoTrust Global was signed by Equifax Secure Certificate Authority.
The certificate of GeoTrust Global CA and Equifax Secure Certificate Authority are in the certificate store of the browser.

Perfect Forward Secrecy (PFS)

Perfect Forward Secrecy (PFS) is a feature of secure communication protocols that prevent compromised session keys. In the commonly used RSA key exchange, SSL sessions between the client and web server are encrypted with the public key and decrypted with the private key. If attackers access the server's private key, they can uncover the session keys and decrypt all conversations from past and future sessions.

In contrast, PFS uses either the standard Diffie-Hellman ephemeral key exchange (DHE) or the Elliptic Curve Diffie-Hellman ephemeral key exchange (ECDHE). DHE uses public-key cryptography, which generates keys with modular arithmetic. In DHE, there is not a link between the server's private key and session key, so the confidentiality of session keys are not dependent on the private keys. If attackers access the server's private key, they are unable to uncover the session key and decrypt the conversation. Furthermore, the server generates different session keys for each conversation with the client. If attackers compromise the session key, they are only able to decrypt the conversation for that particular session. To decrypt all conversations, they must compromise the session keys for every session.

ECDHE is like DHE but uses elliptic-curve cryptography. Elliptic-curve cryptography generates keys using algebraic curves. It is significantly faster than DHE and provides better performance. Elliptic-curve cryptography achieves equivalent security as RSA with smaller keys.

SSL Inspection

HTTPS is an aggregate of HTTP and the SSL/TLS protocol, wherein the authentication and encryption capabilities of SSL/TLS protect HTTP communications. This is vital because the information that is sent on the Internet is passed along from one device to another before it reaches the destination server. Therefore, sensitive information, such as credit card numbers, usernames, and passwords, may be seen by intermediate devices if the information is sent in clear text over HTTP. When the information is encrypted and protected by the SSL protocol, only the intended recipient can read the information.

Unfortunately, the security provided by SSL is also being misused in a number of ways:

SSL encryption is used to hide dangerous content such as viruses, spyware, and other malware.

Attackers build their websites with SSL encryption.

Attackers inject their malicious content into well-known and trusted SSL-enabled sites.

SL can be used to hide data leakage, for example, the transmission of sensitive financial documents from an organization or the like.

SSL can be used to hide, the browsing of websites that belong to legal-liability classes.

As more and more websites use HTTPS, including social media, the ability to control and inspect traffic to and from these sites has become an important piece of the security posture of an organization.

The cloud-based system 100 can inspect HTTPS traffic from an organization. The service can scan data transactions and apply policies to it, as described herein. An enforcement node 150 can function as a full SSL proxy, or SSL man-in-the-middle (MITM) proxy.

The cloud-based system 100 can provide two options to protect HTTPS traffic: SSL inspection, or if SSL inspection is not feasible, one can configure a global block of specific HTTPS content.

Figure 8:
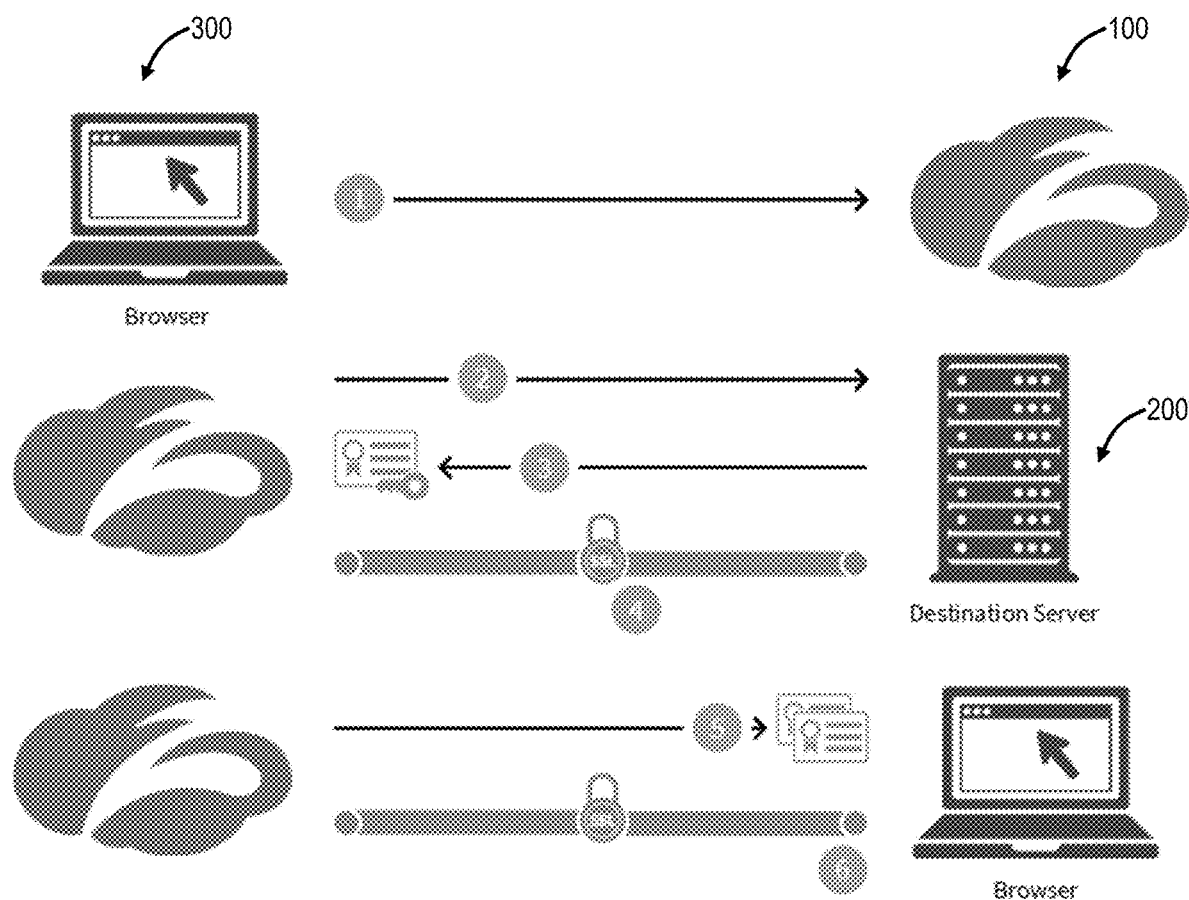
FIG. 8 is a flow diagram illustrating an embodiment of SSL inspection with the cloud-based system as a proxy.

FIG. 8 is a flow diagram illustrating an embodiment of SSL inspection 380 with the cloud-based system 100 as a proxy. In this embodiment, the cloud-based system 100 establishes a separate SSL tunnel with the user's browser and with the destination server. FIG. 8 illustrates the SSL inspection 380 process. First, a user (at the user device 300) opens a browser and sends an HTTPS request. Second, the cloud-based system 100 intercepts the HTTPS request. Through a separate SSL tunnel, the cloud-based system 100 sends its HTTPS request to the destination server (the server 200) and conducts SSL negotiations. The destination server sends the cloud-based system 100 its certificate with its public key. The cloud-based system 100 and destination server complete the SSL handshake. The application data and subsequent messages are sent through the SSL tunnel. The cloud-based system 100 conducts SSL negotiations with the user's browser. R sends the browser an intermediate certificate or an organization's custom intermediate root as well as a server certificate signed by the intermediate CA. The browser validates the certificate chain in the browser's certificate, store. The cloud-based system 100 and the browser complete the SSL handshake. The application data and subsequent messages are sent through the SSL tunnel.

In an embodiment, the SSL inspection can use an intermediate certificate of the cloud-based system 100. With this option, the cloud-based system 100 dynamically generates and signs the server certificate that it presents to the client. This certificate contains the same fields as the original destination server certificate, except for the identifying information of the issuer, called the issuer distinguished name (DN). The issuer DN is set to the name of the cloud-based system 100 intermediate certificate. The browser receives this certificate signed by the cloud-based system 100 intermediate certificates along with the cloud-based system 100 intermediate, certificate. To enable a browser or system to automatically trust all certificates signed by the cloud-based system 100 Certificate Authority, users must install the cloud-based system 100 Root CA certificate on their workstations.

In another embodiment, the SSL inspection can use a custom intermediate root certificate. One can subscribe to the Custom Certificate feature and configure a custom intermediate root certificate for SSL inspection. Here, the cloud-based system 100 does not use an organization's root certificate or private keys, Instead, it uses the custom intermediate root certificate signed by a trusted CA, so it is possible to use a CA that is already deployed on an organization's machines. To configure an intermediate root certificate, the cloud-based system 100 generates a Certificate Signing Request (CSR) with a key pair (i.e., public and private key) and encrypts the private key using AES. The private key is stored securely in the central authority 152, while the CSR contains the public key.

After the CA signs the CSR, the signed certificate can be uploaded to the cloud-based system 100. During the SSL negotiation with the user's browser, the cloud-based system 100 dynamically generates and signs the server certificate that it presents to the client with this intermediate certificate. The certificate issuer is set to the organization name, and the cloud-based system 100 generates the certificate once per site and caches these certificates on the enforcement node 150. These cached certificates are usually valid until their expiration date.

In addition to the intermediate root certificate, it is possible to upload the certificate chain that includes any other intermediate certificates that complete the chain to the intermediate root certificate. When the certificate chain is uploaded, the cloud-based system 100 sends the intermediate root certificate along with this key chain and the signed server certificate to the users' machines during SSL inspection. It the certificate chain is not uploaded, the cloud-based system 100 sends only the organization's intermediate root certificate and its signed server certificate to the user's machine. Uploading the certificate chain provides important benefits. The certificate chain ensures that the users' machines can validate the server certificate signed by the organization's intermediate CA even if the users' browsers have only the root certificate in their certificate store. If the certificate is changed due to the compromise of an intermediate root certificate, or simply as a routine security measure, the ability to send the certificate chain to users' machines during SSL inspection is a key benefit. Because it enables certificate rotation efficiently without the need for a new key ceremony or certificate push to an organization's users.

The cloud-based system 100 provides a CRL (Certificate Revocation List) distribution point (CDP) for every certificate it generates so that client applications can locate the Certificate Revocation Lists (CRLs) as necessary.

SSL Handshake Process

Figure 9:
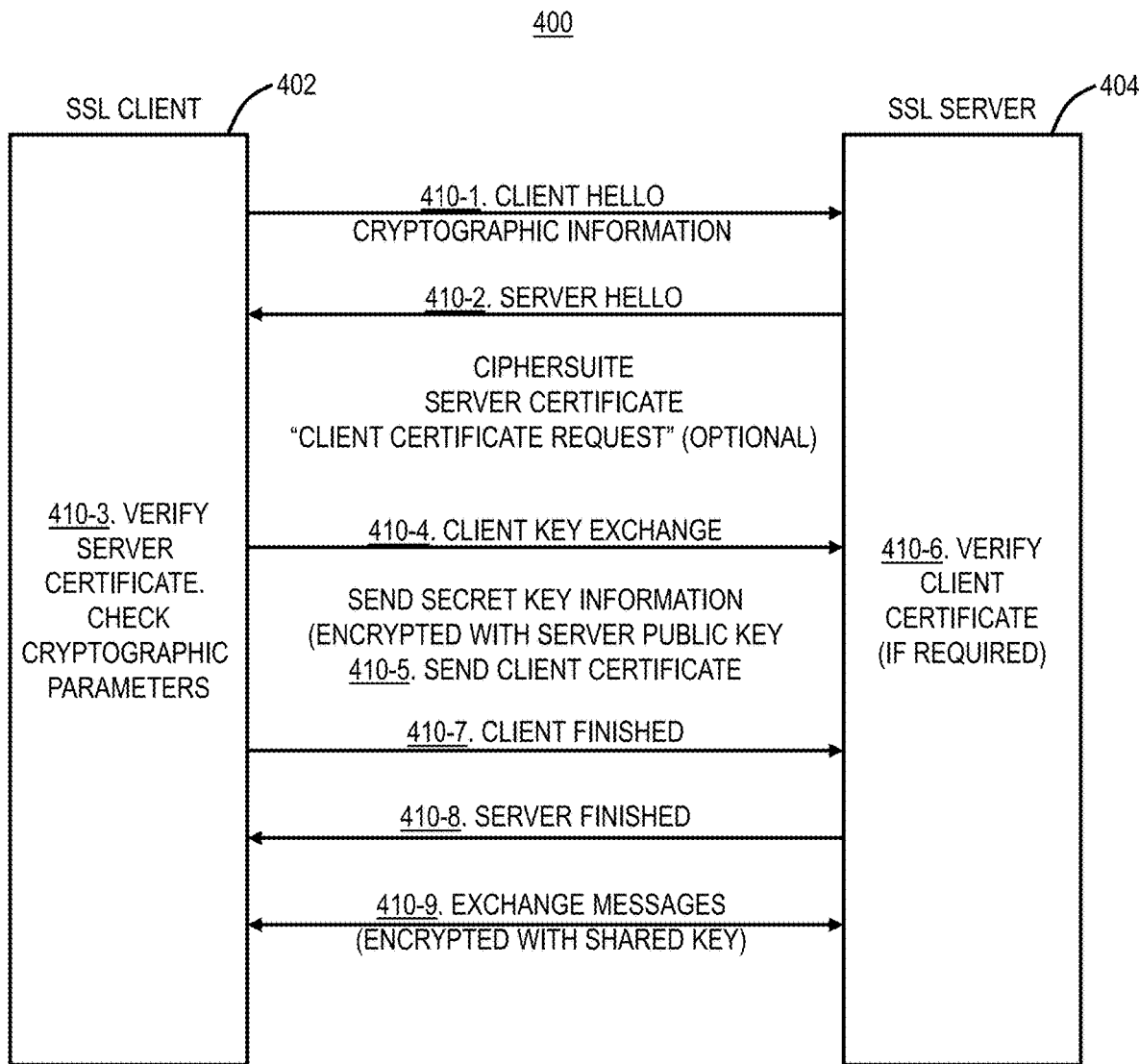
FIG. 9 is a flow diagram of details of an SSL handshake process between an SSL client and an SSL server.

FIG. 9 is a flow diagram of details of an SSL handshake process 400 between an SSL client 402 and an SSL server 404. The SSL client 402 can be the user device 300, etc. and the SSL server 404 can be a location on the Internet 104, etc., i.e., the server 200. That is, the SSL server 404 can be an endpoint for an encrypted tunnel with the user device 300. The SSL client 402 sends a "client hello" message that lists cryptographic information such as the SSL version and, in the client's order of preference, the CipherSuites supported by the SSL client 402 (step 410-1). The message also contains a random byte string that is used in subsequent computations. The protocol allows for the "client hello" to include the data compression methods supported by the SSL client 402.

The SSL server 404 responds with a "server hello" message that contains the CipherSuite chosen by the SSL server 404 from the list provided by the SSL client 402, the session ID, and another random byte string (step 410-2). The SSL server 404 also sends its digital certificate. If the SSL server 404 requires a digital certificate for client authentication, the SSL server 404 sends a "client certificate request" that includes a list of the types of certificates supported and the Distinguished Names of acceptable CAs. The SSL client 402 verifies the SSL server's 404 digital certificate (step 410-3).

The SSL client 402 sends the random byte string that enables both the SSL client 402 and the SSL server 404 to compute the secret key to be used for encrypting subsequent message data (step 410-4). The random byte string itself is encrypted with the SSL server's 404 public key. If the SSL server 404 sent a "client certificate request," the SSL client 402 sends a random byte string encrypted with the client's private key, together with the SSL client's 402 digital certificate, or a "no digital certificate alert" (step 410-5). This alert is only a warning, but with some implementations, the handshake fails if client authentication is mandatory. The SSL server 404 verifies the client's certificate if required (step 410-6).

The SSL client 402 sends the server a "finished" message, which is encrypted with the secret key, indicating that the SSL client 402 part of the handshake is complete (step 410-7). The SSL server 404 sends the SSL client 402 a "finished" message, which is encrypted with the secret key, indicating that the SSL server 404 part of the handshake is complete. For the duration of the SSL session, the SSL server 404 and SSL client 402 can now exchange messages that are symmetrically encrypted with the shared secret key (step 410-9).

SSL Interception Proxies

Figure 10:
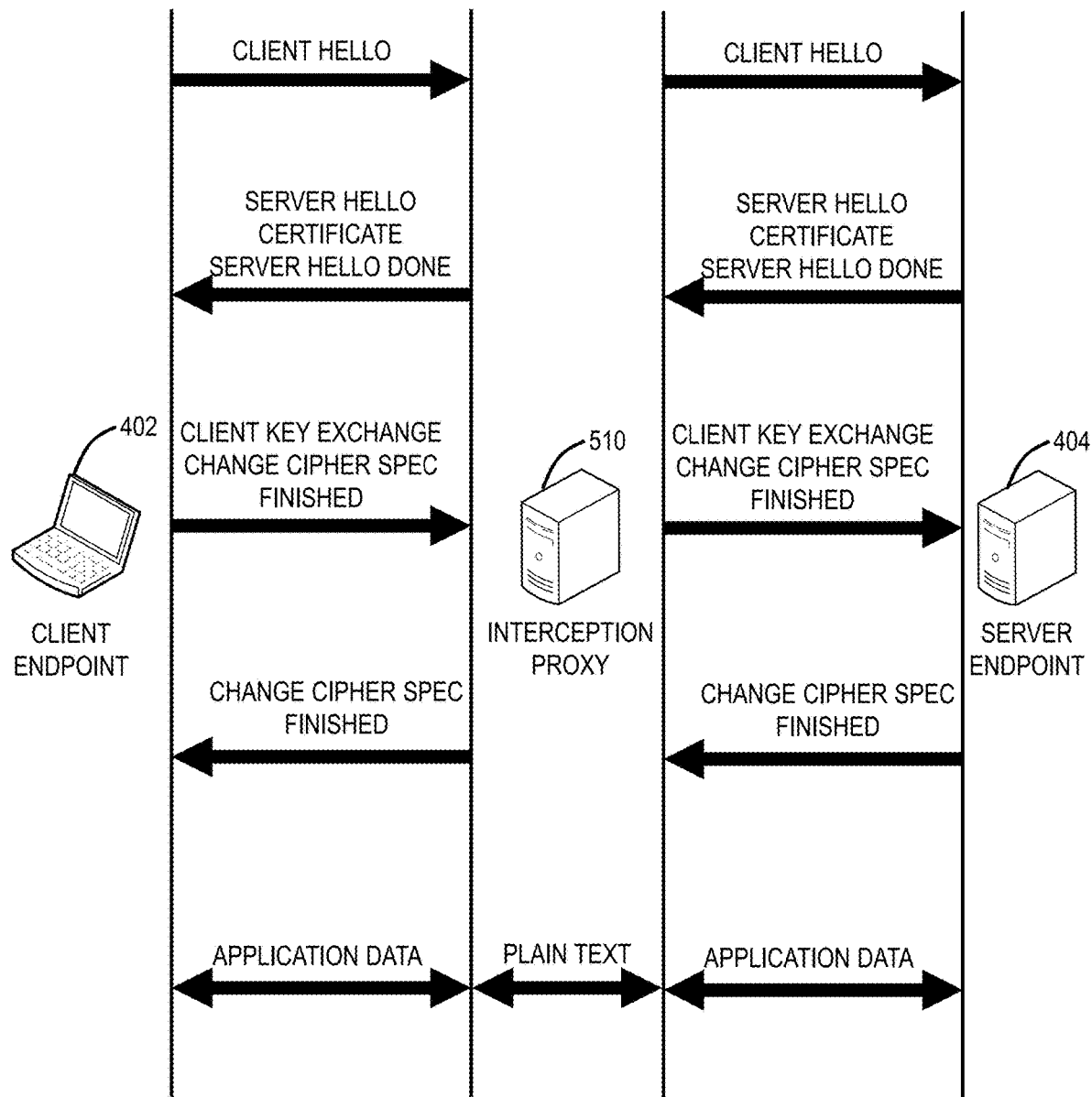
FIG. 10 is a flow diagram of a process performing SSL interception through an interception proxy in the handshake process.

FIG. 10 is a flow diagram of a process 500 performing SSL interception through an interception proxy 510 in the handshake process 400. The interception proxy 510 can be one of the enforcement nodes 150 in the cloud-based system 100. Enterprises deploy or use the interception proxy 510 to secure themselves from SSL-based threats, which are increasingly common. The interception proxy 510 works by acting as a MitM and modifying the encrypted channel. Whenever the SSL client 402 initiates a connection to a remote SSL server 404, the interception proxy 510 will intercept it and open two different channels of communication, one with the SSL client 402 and the other with the SSL server 404 that the SSL client 402 intended to talk to in the first place. This allows the interception proxy 510 to actively modify/inject the content from the SSL client 402 to the SSL server 404 or vice versa. This allows IT admins to perform malware scanning and other security functions on the otherwise encrypted content. In order to achieve this, an IT admin usually deploys proxy's ROOT CA certificate on the user devices 300 for the SSL clients 402 to trust the handshake which happens between the SSL client 402 and the interception proxy 510 which generates a certificate for every SSL server 404 that the SSL client 402 tries to communicate with. This naturally breaks with apps that employ certificate pinning for enhanced security.

Advantageously, the interception proxy 510 enables interception, inspection, and filtering of content on an otherwise encrypted channel. For example, the cloud-based system 100 using the interception proxy 510 can perform DLP, web content filtering, malware detection, intrusion detection/prevention, firewall and Deep Packet Inspection (DPI), etc. The interception proxy 510 acts as the SSL client 402 on the SSL server 404 side and as the SSL server 404 on the SSL client 402 sides.

The interception proxy 510 performs SSL inspection by breaking or terminating the encrypted tunnel in the cloud-based system 100. Specifically, the enforcement node 150 is a proxy, and it has an encrypted tunnel with the client and another encrypted tunnel with the server. That is, this approach requires SSL/TLS/DTLS handshake/termination on the enforcement node 150 (in the cloud, on-premises, etc.). This approach, with the enforcement node 150 as a MitM proxy breaking the tunnel has limitations. Specifically, some applications use Certificate Pinning or other techniques to prevent MitM. With Certificate Pinning, the client is configured to only accept a specific certificate or a specific CA. In this case, the application will break when presented with a certificate signed by the cloud-based system 100, even if it is trusted.

This is done to ensure greater control over the communicating entities and to prevent the MitM attacks. The situation is somewhat of a paradox: entities such as Domain Name Systems (DNS) and CAs are trusted and supposed to supply trusted input. However, more and more applications are trying hard with pinning to eliminate this conference of trust. By pinning the certificate or the public key of the server certificate, an application no longer needs to depend on third-party entities such as DNS, CA, etc. when making security decisions relating to a peer's identity. This makes an app immune to MitM attacks. Pinning effectively removes the "conference of trust" by eliminating the set of entities that are beyond the control of a domain owner. Apps achieve this by accepting server certificates that strictly match a defined criterion, usually subject key information.

With the SSL interception, proxy servers are employed in the cloud-based system 100 are aware of the SSL encrypted communication and may need to intercept it in order to provide security services. Such filtering solutions are generally achieved through interception proxies that engage in deep packet inspection to resist SSL-based threats that may range from trivial viruses to sophisticated ransomware. The problem when apps employ certificate pinning is that they reject the connection during negotiation with an interception proxy on account of peer's (in this case, SSL proxy) untrusted certificate.

Such apps fail to function in the enterprise environment and fail to provide desired services leading to bad user experience and frustration. The apps would be rendered dysfunctional partially or completely due to the certificate pinning employed by them. They will terminate the connection upon receiving a server certificate from the proxy that does not match the criterion. This leads to bad user experience, and the cloud security system does not have any visibility or resolution of such issues.

As more and more viruses use encrypted channels to infect machines, it is imperative for enterprises to employ SSL interception proxies to protect users. This poses a conundrum as app developers would like to eliminate trust on third parties like CAs, which may be vulnerable to other attacks. To solve this issue, an IT admin may be lured to turn SSL interception off, which makes their enterprise security even worse. Hence, it is desirable for IT admins to selectively turn SSL interception off only for some trusted applications and domains. Since it is very hard for IT admins to know apriori which apps users will use or what domains the app may hit, which may even change over time, there is a huge need for a better tunneling solution.

The cloud-based system 100 has little or no idea about the dysfunctional apps. The client apps terminate the connection with or without an alert message to the server upon receiving the mismatched certificate. Further, the IT admin has no way to find all the apps and their server domains for which the app performs pinning. As a result, this design does not allow the users to use such apps while subscribing to the security or enterprise compliance policies. To make these apps functional again, the cloud-based system 100 cannot perform the SSL interception described in FIG. 8, e.g., bypass SSL interception.

SSL Interception

Figure 11:
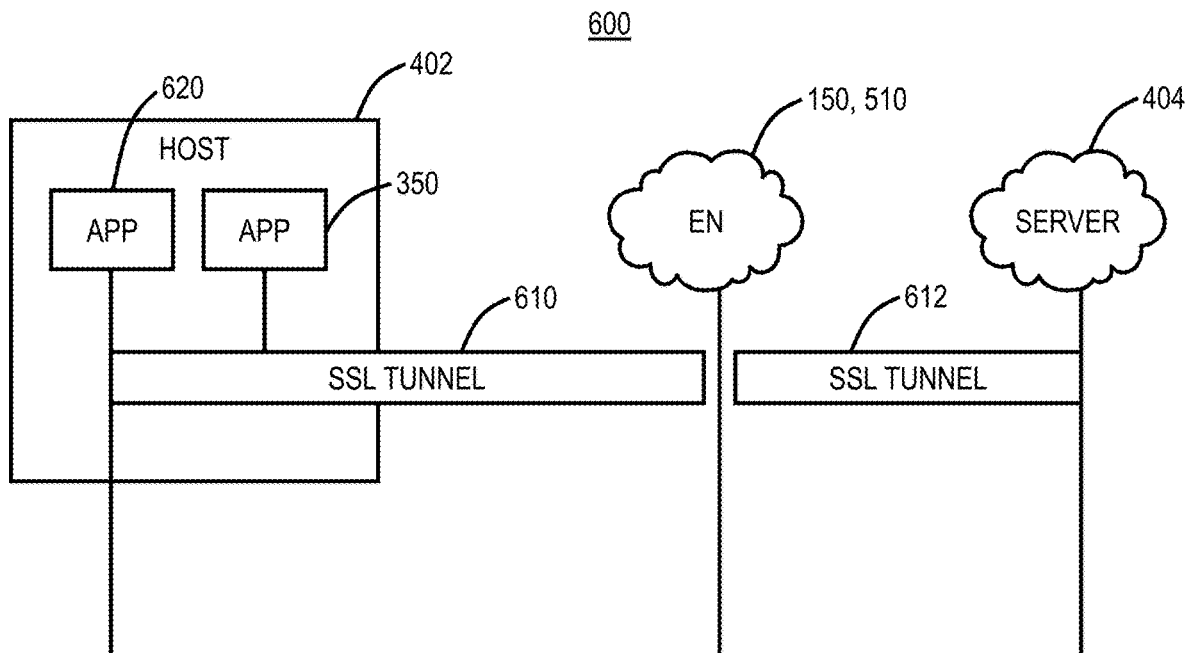
FIG. 11 is a network diagram of a network with an enforcement node operating as an interception proxy to perform.

FIG. 11 is a network diagram of a network 600 with the enforcement node 150 configured as an interception proxy 510. As such, an interception proxy 510 in the cloud-based system 100 can selectively intercept SSL communications. In an embodiment, Internet-bound traffic of the user device 300 (the SSL client 402) is controlled through a tunnel 610 to the cloud-based system 100 which has a second tunnel 612 to the SSL server 404. The tunnel 610 acts as an intermediary passive MitM proxy that relays all the network requests and responses from client applications 620 to the cloud-based system 100. To achieve this, a process running on the host (the SSL client 402) installs a virtual interface on the user device 300. The process installs a default route on the interface in the device routing table and opens listening sockets for User Datagram Protocol (UDP) and Transmission Control Protocol (TCP) traffic at randomly available ports.

SSL Inspection Based on Key Snooping

Figure 12:
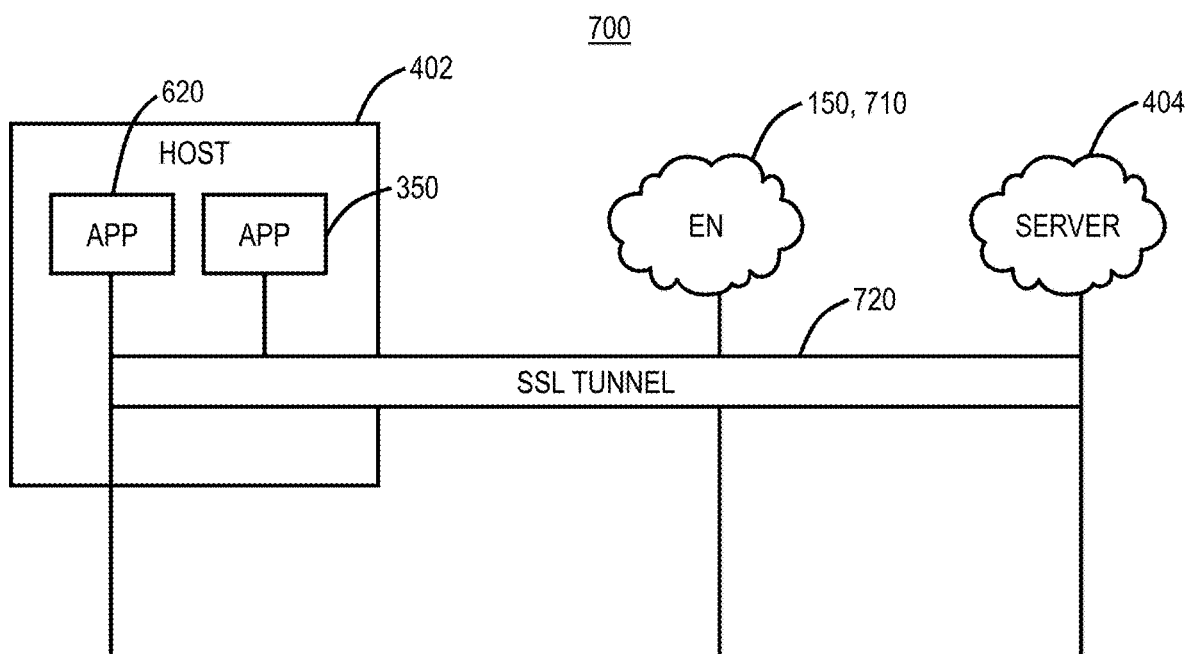
FIG. 12 is a network diagram of a network with the enforcement node operating as a snooping proxy to perform SSL interception without breaking the tunnel as with the interception proxy.
Figure 13:
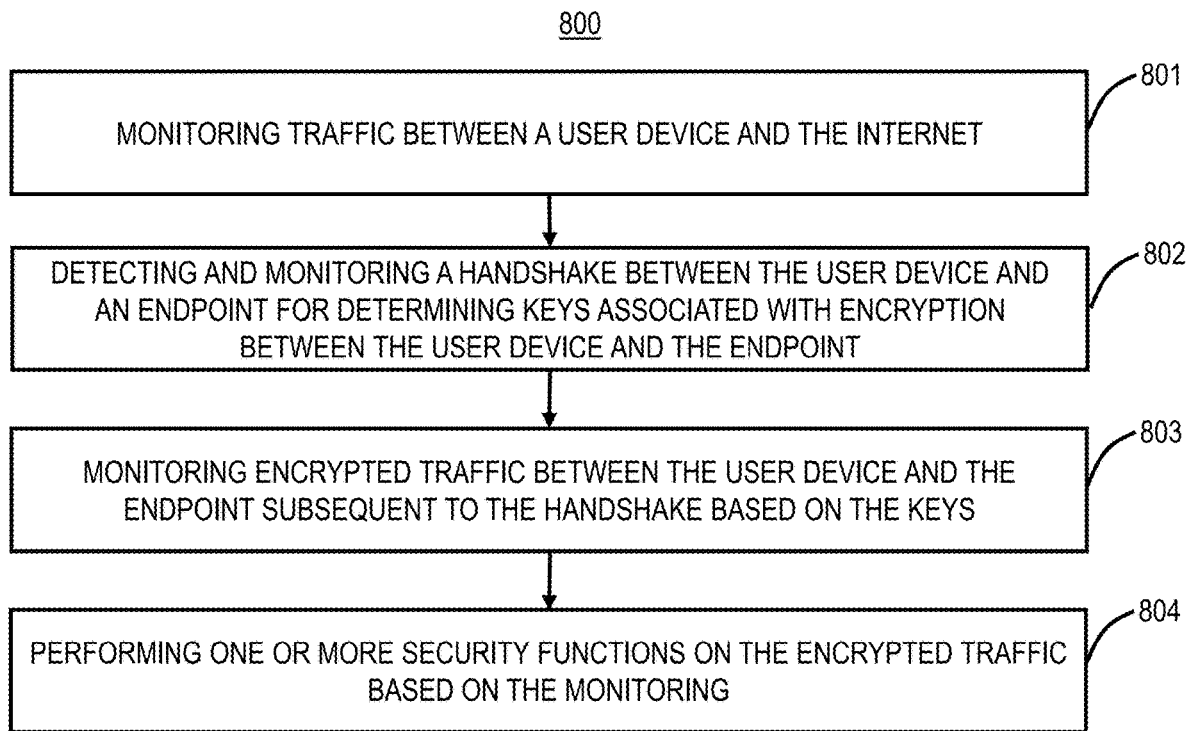
FIG. 13 is a flowchart of a process for SSL (or other type of encrypted traffic) inspection by snooping, such as via a node operating as the snooping proxy.

FIG. 12 is a network diagram of a network 700 with the enforcement node 150 operating as a snooping proxy 710 to perform SSL interception without breaking the tunnel as with the interception proxy 510. This presents a different approach for SSL interception than the interception proxy 510, which avoids the disadvantages of certificate pinning and certificate management. In the network 700, a tunnel 720 is between the SSL client 402 and the SSL server 404. Again, the tunnel 720 can be SSL, TLS, DTLS, HTTPS, etc. The key difference with the snooping proxy 710 relative to the interception proxy 510 is the snooping proxy 710 does not break the tunnel 720. Note, the snooping proxy 710 is still a MitM proxy like the interception proxy 510.

The snooping proxy 710 can be one of the enforcement nodes 150 in the cloud-based system 100. Also, the client 402 can be the user device 300 including the application 350. As described herein, the application 350 is a traffic-forwarding application that enables the user device 300 to operate (communicate) with the cloud-based system 100. The snooping proxy 710, being already a MitM proxy, can snoop (monitor) on the handshake process 400. This snooping can be at the enforcement node 150 operating as the snooping proxy 710 as well as at the application 350. This snooping can also use key agents, such as part of the application 350, operating system support hooks, such as at the user device 300, etc. The key aspect here is the snooping proxy 710 can snoop the handshake process 400 for purposes of obtaining keys.

Once the snooping proxy 710 has keys for a given session, the snooping proxy 710 can monitor the encrypted traffic on the tunnel 720. Note, typically, monitoring in the cloud-based system 100 is inline in a sense the enforcement node 150 sits directly between the client 402 (the user device 300) and the server 404 (or any other destination on the Internet 104, the cloud services 106, etc.). Here, the snooping proxy 710 is still inline. The snooping proxy 710 can receive encrypted traffic, view and inspect the traffic based on the snooping of the keys, and allow or block the traffic based on the inspection.

This approach solves the various limitations with a traditional MitM proxy as an interception proxy 510. That is, applications with certificate pinning now can support SSL inspection to block policy violations or malware transfers. This removes the need for certificate deployments with the cloud-based system 100. Also, it is possible to decode any other variant of SSL to inspect or detect application signature (aka DPI) inside an encapsulated layer or protocol. Further, this approach is completely transparent to primitive SSL-based applications such as FTPS, which cannot trust MitM root certificates. Finally, this allows granular policy control and transactional visibility for critical or productivity applications without breaking the SSL protocol.

SSL Profile Construction, Learning and Transfer of Knowledge

In either SSL environment, namely the interception proxy 510 and the snooping proxu 710, for every new connection, the application 350 process on the device can create a state machine or the like for the transaction, and, based on the results of the transaction, the process constructs a profile for the SSL client 402 which initiated the connection. For every connection, the process can construct a profile for the connection as a tuple: <Origin, Host-Name, Destination-Socket-Address, Handshake-Status, Key information>.

The origin is the client application 620, which is originating a request. The origin information is obtained through a process to port mapping on the host machine. The Host Name is the fully qualified domain name of the SSL server 404 that the SSL client 402 is trying to reach. The hostname is retrieved from the SNI (Server Name Indication) parsed as a TLS extension in the Client Hello SSL record. The Destination Socket contains information about Destination-Server-IP-Address:Destination-Port that the SSL client 402 is trying to establish a connection. This information is retrieved by parsing the IP-packet header during connection establishment.

The Handshake Status is a bit flag that keeps a record of SSL handshake messages exchanged with the SSL server 404. The flag is set to 1 if the handshake succeeds, and the client starts sending Application Data to the server. The profile is learned for every transaction and reevaluated whenever the SSL client 402 tries to reach the same destination. This knowledge is periodically transferred to the cloud-based system 100 out-of-band on a persistent control channel that allows the cloud-based system 100 to learn the behavior of client apps 620 with SSL interception.

To construct this profile, the process passively observes the SSL Record Layer data messages and keep track of all the records that have been exchanged for any given transaction. For example, the process can parse the SSL headers to check if the SSL client 402 returns an SSL alert and/or if application data is sent over the connection. The process can parse the initial (K) server bytes and check the intermediate CA certificate from the enforcement node 150. The process can find the processes and host corresponding to the connection.

The following SSL handshake messages can be recorded:

Client hello to determine the SSL server 404 the SSL client 402 wants to connect with. The SNI host field provides the information.

Server Hello to determine the server response towards the client request and client supported ciphers.

A certificate that contains the certificates advertised by the SSL server 404 and which is used to check if SSL interception is enabled for the transaction.

Alert (optional), which indicates if the SSL client 402 rejected the certificate and the reason for rejection.

Application data which indicates the successful handshake since the application data is exchanged now.

This process can be extended to generate more detailed profiles containing the ciphers supported by the SSL client 402 and the SSL server 404, SSL version, certificate chain, etc.

Every SSL message is sent as part of the Record Layer Protocol which provides messages in the following format:

| Content type (1 Octet) | Version (2 Octets) | Length (2 Octets) | Data |
| --- | --- | --- | --- |

Security Functions on Traffic with SSL Inspection, Either with the Interception Proxy or the Snooping Proxy The cloud-based system 100 can support various security functions on encrypted traffic, including:

Granular URL filtering and cloud app control policies where the cloud-based system 100 can enforce granular user, group, and location policies that not only control access to sites or applications but also control what a user can do within an application. For example, it is possible to define a Web email policy that allows users to view and send mail, but not attachments, or a social media policy that allows users to view Facebook, but not post.

Skipping Inspection for Specific URLs/URL categories: When configuring SSL Inspection policy, it is possible to prevent the service from inspecting sessions to certain URLs or URL categories (for example, in the Banking and Healthcare URL categories). This list can apply globally through an organization as well as granular to users, groups of users, etc.

Skipping Inspection for Specific Cloud Applications/Cloud Application Categories: When configuring SSL Inspection policy, it is possible to prevent the cloud-based system 100 from inspecting transactions to specific cloud applications or cloud application categories. This list can apply globally through an organization as well as granular to users, groups of users, etc.

Content Filtering where the cloud-based system 100 is enabled to block malicious or inappropriate content in a page, such as during a Google search.

Block Undecryptable Transactions: wherein the cloud-based system 100 is configured to block the transactions of applications that the cloud-based system 100 cannot decrypt because of using non-standard encryption methods and algorithms, as well as where snooping fails and where the interception proxy 510 encounters certificate pinning.

Block Advanced Persistent Threats (APT) in encrypted traffic. Note, most targeted malware is now delivered over SSL.

Control access to Google consumer apps and non-corporate Google accounts.

Block access to sites with revoked certificates: The cloud-based system 100 supports OCSP (Online Certificate Status Protocol) to verify the validity of all server certificates. It verifies the OCSP responder URL in a server's certificate and sends an OCSP request to the responder. The cloud-based system 100 allows access if the responder indicates that the certificate is Good, and blocks access if the responder responds that the certificate is Unknown or Revoked. The cloud-based system 100 displays a notification when it blocks access to a site due to a bad certificate (if the certificate issuer is unknown, or if the certificate has expired, or if the Common Name in the certificate does not match). It also logs these transactions with "bad server cert" in the policy field.

Data Loss Prevention (DLP): The cloud-based system 100 can enforce the DLP policy when SSL inspection is enabled.

Of note, the enforcement node 150 can be configured, not as a caching proxy. Data is inspected in the enforcement node's 150 memory after decryption and sent out to the client immediately. Even when a core dump is taken on the enforcement node 150, SSL (encrypted) session data is cleared before the dump file is created. SSL session data is never written to disk.

SSL Inspection Process by Snooping

FIG. 14 is a flowchart of a process 800 for SSL (or other type of encrypted traffic) inspection by snooping, such as via a node operating as the snooping proxy 710. The process 800 contemplates implementation as a method, as a computer-readable code stored on a non-transitory computer-readable storage medium for programming the node operating as the snooping proxy 710, and one the node operating as the snooping proxy 710.

The process 800 includes monitoring traffic between a user device and the Internet (step 801); detecting and monitoring a handshake between the user device and an endpoint for determining keys associated with encryption between the user device and the endpoint (step 802); monitoring encrypted traffic between the user device and the endpoint subsequent to the handshake based on the keys (step 803); and performing one or more security functions on the encrypted traffic based on the monitoring (step 804). The node can be the enforcement node 150 that is part of a cloud-based security system, i.e., the cloud-based system 100, and configured inline between the user device and the endpoint.

The process 800 can further include one of blocking or allowing the encrypted traffic based on the one or more security functions. The one or more security functions can include any of access control, threat prevention, and data protection, as described in detail herein. The endpoint can include an application utilizing certificate pinning. The process 800 can further include obtaining data related to the keys from a traffic-forwarding application executed on the user device. The process 800 can further include blocking the encrypted traffic responsive to being unable to decrypt the encrypted traffic with the keys.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented as a node configured as any of a proxy, a Secure Web Gateway, and a Secure Internet Gateway, the method comprising steps of:
    responsive to establishing a connection with a user device having a user associated with a tenant and obtaining policy for the user, monitoring traffic between the user device and the Internet where the monitoring is at a middle location, inline between the user device and an endpoint;
    responsive to the traffic being encrypted as a tunnel, performing one or more operations to enable accessing the encrypted traffic;
    analyzing the traffic based on the policy, including at least checking for malicious traffic and Data Loss Prevention (DLP) for the tenant; and
    one of allowing, blocking, or limiting the traffic based on the analyzing.

2. The method of claim 1, wherein the one or more operations include breaking the tunnel where the node operates as an interception proxy.

3. The method of claim 1, wherein the encrypted traffic includes any of Secure Sockets Layer (SSL), Transport Layer Security (TLS), Hypertext Transfer Protocol Secure (HTTPS), and Datagram TLS (DTLS).

4. The method of claim 1, wherein the snooping includes receiving associated session keys from a traffic-forwarding application executed on the user device.

5. The method of claim 1, wherein the steps further include
    blocking the traffic responsive to being unable to perform the one or more operations.

6. The method of claim 1, wherein the steps further include
    blocking the traffic responsive to the user device being in a specific location.

7. The method of claim 1, wherein the encrypted traffic is associated with an application utilizing certificate pinning.

8. The method of claim 1, wherein the analyzing includes analyzing a Uniform Resource Locator (URL) based on the policy.

9. The method of claim 1, wherein the analyzing includes protection against advanced threats including any of malware, spam, Cross-Site Scripting (XSS), and phishing.

10. The method of claim 1, wherein the tenant is one of a plurality of tenants each having respective policy.

11. A non-transitory computer-readable storage medium having computer-readable code stored thereon for programming a node, operating as any of a proxy, a Secure Web Gateway, and a Secure Internet Gateway, to perform steps of:
    responsive to establishing a connection with a user device having a user associated with a tenant and obtaining policy for the user, monitoring traffic between the user device and the Internet where the monitoring is at a middle location, inline between the user device and an endpoint;
    responsive to the traffic being encrypted as a tunnel, performing one or more operations to enable accessing the encrypted traffic;
    analyzing the traffic based on the policy, including at least checking for malicious traffic and Data Loss Prevention (DLP) for the tenant; and
    one of allowing, blocking, or limiting the traffic based on the analyzing.

12. The non-transitory computer-readable storage medium of claim 11, wherein the one or more operations include breaking the tunnel where the node operates as an interception proxy.

13. The non-transitory computer-readable storage medium of claim 11, wherein the encrypted traffic includes any of Secure Sockets Layer (SSL), Transport Layer Security (TLS), Hypertext Transfer Protocol Secure (HTTPS), and Datagram TLS (DTLS).

14. The non-transitory computer-readable storage medium of claim 11, wherein the snooping includes receiving associated session keys from a traffic-forwarding application executed on the user device.

15. The non-transitory computer-readable storage medium of claim 11, wherein the steps further include
    blocking the traffic responsive to being unable to perform the one or more operations.

16. The non-transitory computer-readable storage medium of claim 11, wherein the steps further include
    blocking the traffic responsive to the user device being in a specific location.

17. The non-transitory computer-readable storage medium of claim 11, wherein the encrypted traffic is associated with an application utilizing certificate pinning.

18. The non-transitory computer-readable storage medium of claim 11, wherein the analyzing includes analyzing a Uniform Resource Locator (URL) based on the policy.

19. The non-transitory computer-readable storage medium of claim 11, wherein the analyzing includes protection against advanced threats including any of malware, spam, Cross-Site Scripting (XSS), and phishing.

20. The non-transitory computer-readable storage medium of claim 11, wherein the tenant is one of a plurality of tenants each having respective policy.

* * * * *